(12) United States Patent  (10) Patent No.: US 7,725,714 B2
Immonen  (45) Date of Patent: May 25, 2010

(54) METHOD FOR CHECKING THE INTEGRITY OF DATA, SYSTEM AND MOBILE TERMINAL

(75) Inventor: Olli Immonen, Helsinki (FI)

(73) Assignee: Nokia Corporation, Espoo (FI)

( * ) Notice: Subject to any disclaimer, the term of this patent is extended or adjusted under 35 U.S.C. 154(b) by 976 days.

(21) Appl. No.: 10/182,940

(22) PCT Filed: Feb. 1, 2001

(86) PCT No.: PCT/FI01/00093

§ 371 (c)(1), (2), (4) Date: Nov. 18, 2002

(87) PCT Pub. No.: WO01/58081

PCT Pub. Date: Aug. 9, 2001

(65) Prior Publication Data

US 2003/0120924 A1 Jun. 26, 2003

(30) Foreign Application Priority Data

Feb. 1, 2000 (FI) .................................. 20000203

(51) Int. Cl.
H04L 9/00 (2006.01)

(52) U.S. Cl. ..................................................... 713/168
(58) Field of Classification Search ........................ None
See application file for complete search history.

(56) References Cited

U.S. PATENT DOCUMENTS

| | | | |
|---|---|---|---|
| 4,965,827 A | 10/1990 | McDonald | |
| 5,319,710 A * | 6/1994 | Atalla et al. | 705/75 |
| 5,539,826 A | 7/1996 | Dwork et al. | |
| 5,598,459 A | 1/1997 | Haartsen | |

(Continued)

FOREIGN PATENT DOCUMENTS

EP 0 651 357 5/1995

(Continued)

OTHER PUBLICATIONS

Schneier, B., "Applied Cryptography", 1996, John Wiley & Sons, 2nd Edition, pp. 442-445.*

(Continued)

Primary Examiner—Minh Dinh
(74) Attorney, Agent, or Firm—Ware, Fressola, Van Der Sluys & Adolphson LLP

(57) ABSTRACT

The invention relates to a method for checking the integrity of a message transmitted between a sender in a transmitting end and a recipient in a receiving end, in which method an authentication value is calculated for the first message and a random string is generated. According to a method in the transmitting end an authentication value is generated from a message to be sent and the random string. A check code is formed from the authentication value and the random sting. The first message is transferred from a sender to a recipient through a first channel, and the check code is transferred through a second secure channel. In the receiving end a message is received through a first channel and the check code is received through a second secure channel. In the receiving end an authentication check formed at least based of the received message. The integrity of the received message is checked by comparing the predetermined check values in the receiving end.

18 Claims, 5 Drawing Sheets

U.S. PATENT DOCUMENTS

| | | | |
|---|---|---|---|
| 5,606,609 A | | 2/1997 | Houser et al. |
| 6,041,409 A | * | 3/2000 | Zunquan .................... 713/176 |
| 6,463,534 B1 | * | 10/2002 | Geiger et al. ............... 713/168 |
| 6,560,706 B1 | * | 5/2003 | Carbajal et al. ............. 713/155 |
| 6,606,709 B1 | * | 8/2003 | Connery et al. ............... 726/14 |
| 7,036,015 B2 | * | 4/2006 | Vanstone et al. ........... 713/180 |

FOREIGN PATENT DOCUMENTS

| | | |
|---|---|---|
| EP | 0930795 | 7/1999 |
| JP | 7-129513 | 5/1995 |
| JP | 09-311854 | 12/1997 |
| JP | 10-334164 | 12/1998 |
| JP | 11-355268 | 12/1999 |
| WO | 97/18655 | 5/1997 |
| WO | WO 98/03026 | 1/1998 |
| WO | 9923617 | 5/1999 |
| WO | 0003316 | 1/2000 |
| WO | 0069206 | 11/2000 |

OTHER PUBLICATIONS

Handbook of Applied Cryptography, Menezes et al., CRC Press, 1997, Table of Contents, Forward, and Preface, along with Chapter 9.6 "Data integrity and message authentication", pp. 359-368.

Partial translations of cited references 3, 4 and 6 (JP 11-355268, 10-334164 and 09-311854) supplied by Japanese associate, 5 pages.

Shizensha Co., Ltd.; C. Meyer et al.; "Cryptography; a new dimension in computer data security"; pp. 498-501; Feb. 10, 1986.

Kyoritsu Shuppan Co., Ltd.; E. Okamoto; "Introduction to Cryptograph Theory"; pp. 133-135; Feb. 25, 1993.

Japanese Patent Office; "Notice of Reasons for Rejection"; whole document; Jul. 7, 2009. English translation included.

* cited by examiner

METHOD FOR CHECKING THE INTEGRITY OF DATA, SYSTEM AND MOBILE TERMINAL

CROSS-REFERENCE TO RELATED APPLICATIONS

Priority is claimed from International Application PCT/FI01/00093 filed Feb. 1, 2001, which in turn claims priority from Finnish Application 20000203, filed Feb. 1, 2000.

BACKGROUND OF THE INVENTION

1. Field of the Invention

The invention relates to a method for checking the integrity of data transmitted. More closely the invention relates to a method for checking the integrity of data transmitted with an out-of-band check code.

2. Description of Related Art

Data transmission through different kinds of networks is increasing very rapidly. As a result, more and more private and secret data is transferred through the networks. This kind of data is for example credit card numbers and such. It is very important to be sure that data or a message received is from a correct sender. In addition, it is very important to be sure that nobody has changed the data in the transmission path so that the correct information is transmitted to the recipient.

Many times data is meant for devices connected to a network for controlling the operation of the devices. These kinds of devices can for example be network elements and terminals. Especially, in many cases it is necessary to distribute so called bootstrap information to network devices. Here the bootstrap information means data, which is used for bringing a certain system into a desired state for a certain operation. This kind of information is for example provisioned data, which contain information relating to network operation, like server addresses and Certification Authority certificates. When transmitting this kind of information the security becomes very important. If a person not entitled to the information changes the data and forwards it to the terminal, the consequences can be serious in the network. When transmitting this kind of information it is also very important to be sure that data is correct.

Generally, the requirements from a security point of view are that the data comes from a correct sender and that the data has not been changed in the transmission path, as said earlier. Usually, a term verify the authenticity is used to represent the verification of the sender and a term integrity to represent if the message or data has been changed in the transmission path or not. These terms are also used in the following parts of this description.

Different kinds of methods have been developed to transmit data in a secure way from the sender to the recipient. Almost without exception these methods are always based on algorithms, which are used for encrypting and decrypting the message so that only the correct sender and the correct recipient are able to find out the content of the message. Many times these algorithms are based on so called private and public key pair method. In this method the sender creates both of the keys and delivers the public key to persons concerned. The private key is kept secret from everybody. A message, which is encrypted with a public key, is possible to decrypt only with a corresponding private key.

Different other kinds of methods have been developed as well to achieve a needed security in data transmission. If we consider for example provisioning of the bootstrap type data, especially over the air, as in mobile telecommunication, a MAC (Message Authentication Code) based verification method has been proposed. In the MAC based verification method a MAC code is appended to the message. Typically MAC is a string of bits, which depends in some specified way on the message to which it is to be appended and on a secret key known both by the sender and by the recipient of the message. The code to be appended to the message can for example be a block, which is formed with a Secure Hash Algorithm (SHA). The combination of the message and the MAC code is transmitted through an unreliable channel. By the term unreliable channel it is meant a channel, which is not secure for data transmission because anyone can monitor the data sent through the transmission path. For decrypting the received data a MAC key is also delivered to the recipient. Advantageously, the MAC key is delivered through an out-of-band channel and it is based on a user input. In a typical situation the user input is a password.

This kind of MAC based verification method has a problem that if the password is not long enough, it can be processed from the combination of the message and the MAC code by means of computer by an attacker. A possible way to do this is to try all possible passwords until one is found with which the calculated MAC code based on the password and the MAC code transmitted along with the message match with each other. When the password is found the attacker can generate a new message, which will be successfully verified by the recipient. If the original data is changed and the new data is used for original purposes, it can cause serious consequences.

To minimize the risk that an attacker finds out the password the length of the password can be increased. If the number of bits in the password is big enough it takes a longer time to find out the MAC code and the objective is that it takes too long a time to find out the content of the message and change it.

Another problem in the MAC based verification method, especially applied in the bootstrap information type data, is that in many cases the bootstrap information is global (e.g. provisioning addresses, Certification Authority certificate), but the MAC code requires that the message is personalized, because of the passwords.

One method in practice, which is used for checking the validity of certification authority certificates, is to display a fingerprint, like a complete hash code, of the Certification Authority certificates and ask the user to check it. The user can check the displayed fingerprint by comparing it to a certificate, which is gotten from a newspaper or from the Internet or such. This method is quite secure in principle, but requires activity from the user.

SUMMARY OF THE INVENTION

An object of the invention is to present a new method for checking the integrity of a received message. Another object of the invention is to present a system, which uses the method according to the invention. A third object is to present a mobile terminal, which uses the method according to the invention for checking the integrity of a received message.

Objects of the invention are achieved by transmitting a message through a first channel and integrity checking values through a second secure channel from a sender to a recipient and performing the integrity checking in a predetermined way in the receiving end.

The method for checking the integrity of a first message transmitted between a sender in a transmitting end and a recipient in a receiving end, in which method an authentication value is calculated for the first message and a random string is generated, is characterized in that the first message is transmitted from the sender to the recipient through a first channel and the authentication value and the random string are transmitted to the recipient through a second secure channel for checking the integrity of a received message in the receiving end.

The system for checking the integrity of a first message transmitted between a sender in a transmitting end and a recipient in a receiving end, in which the system comprises means for calculating an authentication value for the first message and means for generating a random string, is characterized in that in the transmitting end the system comprises means for forming a check code by combining the authentication value and the random string, means for transferring the first message from the sender to the recipient through the first channel, and means for transferring said check code from said sender to said recipient through the second secure channel, and in the receiving end the system comprises means for separating said authentication value and said random string from said check code, means for generating an authentication check from the received message and from either said random string or said authentication value, and means for comparing said authentication check with either said authentication value or said random string not used in the generation of said authentication check for checking the integrity of said received message compared to the first message.

The mobile terminal for checking the integrity of a message received, into which mobile terminal a first message is sent, characterized in that the mobile terminal comprises means for receiving a message, input means for inputting a check code of the first message received through a secure channel into said mobile terminal, means for separating an authentication value and a random string from said check code of said first message, means for generating an authentication check from said received message and from either said authentication value or said random string, and means for comparing said authentication check with either said authentication value or said random string not used in the generation of said authentication check for checking the integrity of said received message compared to the first message.

Advantageous embodiments of the invention are described below.

According to the invention the integrity and authentication of a message is checked in a new way. The message is transmitted through a first channel to the recipient. The message does not contain any kind of authentication value. The integrity and authentication of the message is checked so that a check code is calculated in the transmitting end and transmitted to the recipient through another channel. The other channel is chosen so that it is secure enough for transferring confidential data. In the receiving end the message is checked with the check code. A system according to the invention comprises means for performing the operations relating to the method. A mobile terminal according to the invention comprises means for checking the integrity of the message received by using the check code.

BRIEF DESCRIPTION OF THE DRAWINGS

Same reference numerals are used for similar entities in the figures.

DETAILED DESCRIPTION OF THE INVENTION

Figure 1:
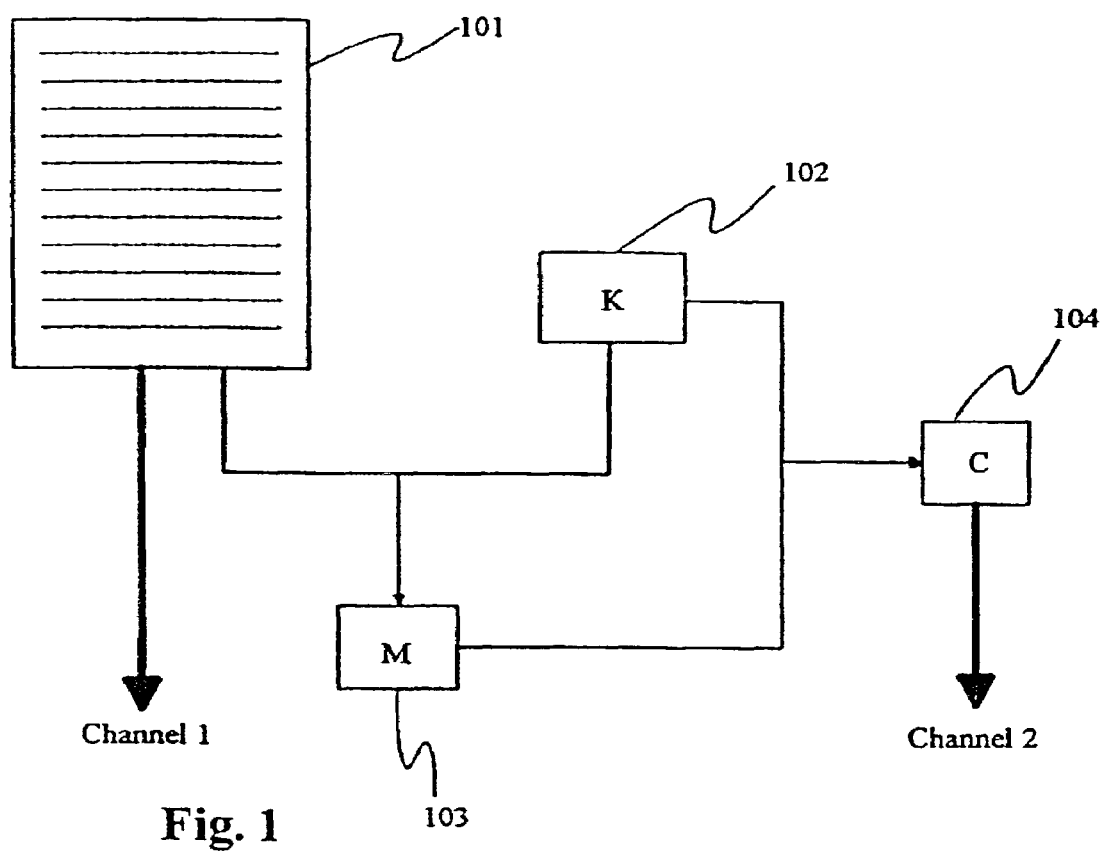
FIG. 1 illustrates a preferred embodiment of the invention in the transmitting end.

FIG. 1 illustrates a way of calculating required information for making sure that the information is from the correct sender. According to the invention a message 101 is formed. In addition to the message 101 a key 102 is also formed. Advantageously, the key 102 is a random string, which consists of a predetermined number of digits or bits. The number of these is not restricted anyhow. The message 101 and the key 102 are used for generating an authentication value 103, like MAC. The authentication value 103 is derived from the message 101 and the key 102 with mathematical operations. By combining the key 102 and the authentication value 103 a check code 104 can be derived. The first message 101 and the check code 104 are transmitted from the sender to recipient through different channels.

Figure 2:
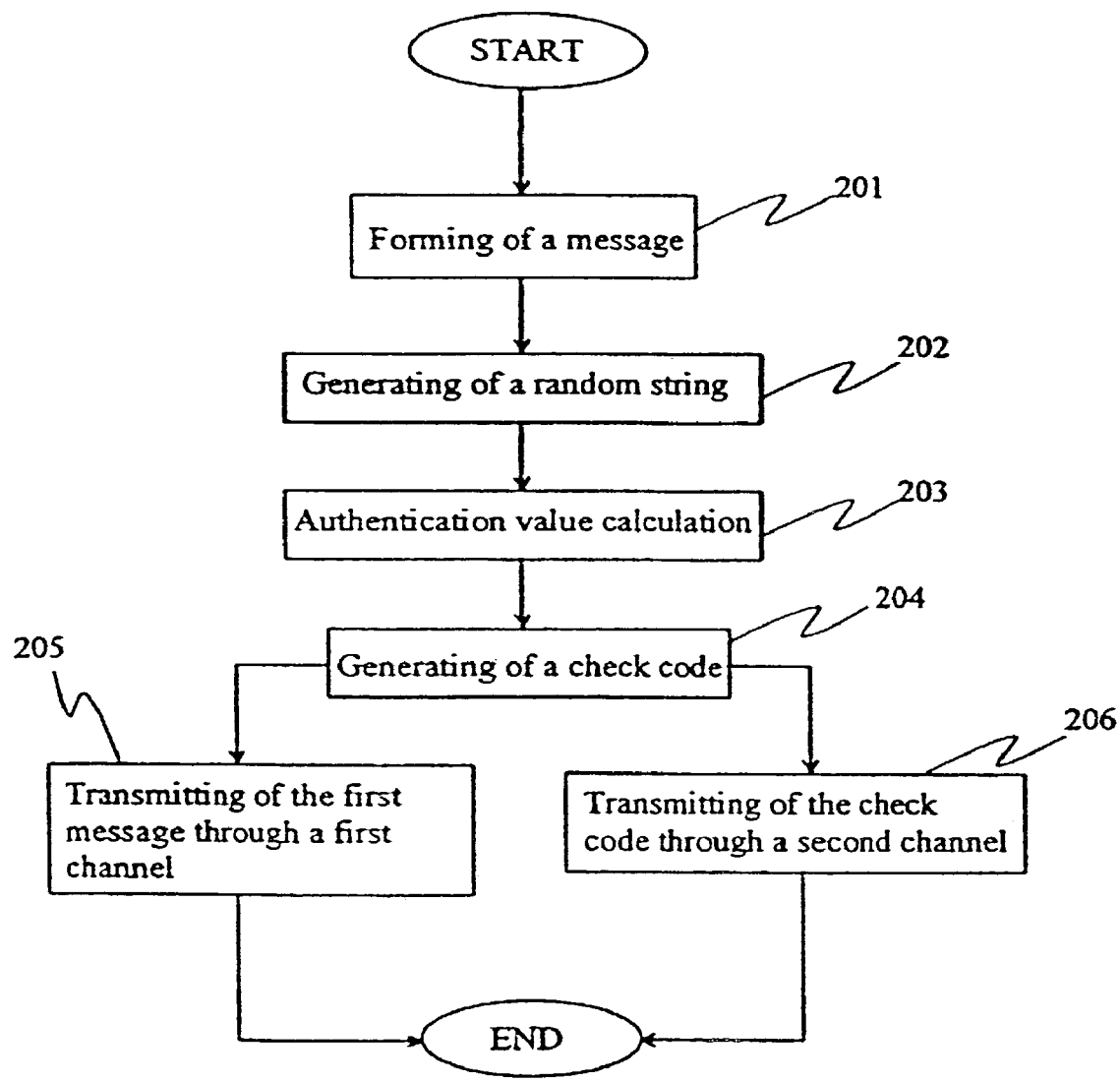
FIG. 2 illustrates a method according to a preferred embodiment of the invention in the transmitting end.

In FIG. 2 it is illustrated the method according to the invention in the transmitting end. In the first step 201 a message 101 to be sent is formed. The message 101 comprises for example bootstrap information or any other kind of information, in which the integrity is important. In the method according to the invention a random string is generated in the second step 202. The random string can be generated by means of a random number generator. In the preferred embodiment of the invention a new random string, which can also be called a key 102, is generated always when sending a new message 101. Naturally, it is also possible to use the same random string with all messages 101 but this means that the security in this method is not as good as in the method according to the preferred embodiment. In the next step 203 of the method according to the invention an authentication value 103 is calculated. The authentication value 103 can for example be a MAC code. The authentication value 103 is calculated by using an algorithm. The algorithm can be such as secure hash algorithm (SHA), which is widely applied in encryption applications. Advantageously, the algorithm generates the authentication value 103 so that it uses the message 101 and/or the random string as parameters for mathematical operations.

To generate a data by means of which the integrity of the message 101 can be checked, the authentication value 103 and the random string are combined in a fourth step 204 producing a check code 104. This can be done in many ways. In the simplest case these values are combined to each other by adding the random string after the authentication value 103 or vice versa. In another embodiment of the invention a sort of arithmetic operation is used for combining the values. The values can also be combined any other way than shown here. To a man skilled in the art it is obvious that the authentication value 103 and the random string are converted to such a number system that the mathematical operation in the combination can be performed. Finally, the first message 101 is transferred through a first channel 205, which can be any kind of channel available. The channel need not be secure. The channel can for example be created over the Internet. Correspondingly, the check code 104 is transmitted to the recipient through another channel 206, which channel according to the invention is a secure one and advantageously out-of-band. By word out-of-band it is meant a channel through which the message is not transmitted. The out-of-band channel can be formed through different entities than through which the message is transmitted.

To anyone skilled in the art it will be evident that at least a part of the method steps described above can be performed concurrently or in other order than described in FIG. 2. As well it will be evident that the transmission of the random string and the authentication value 103 can also be performed separately so that they are not combined in the transmitting end.

Figure 3A:
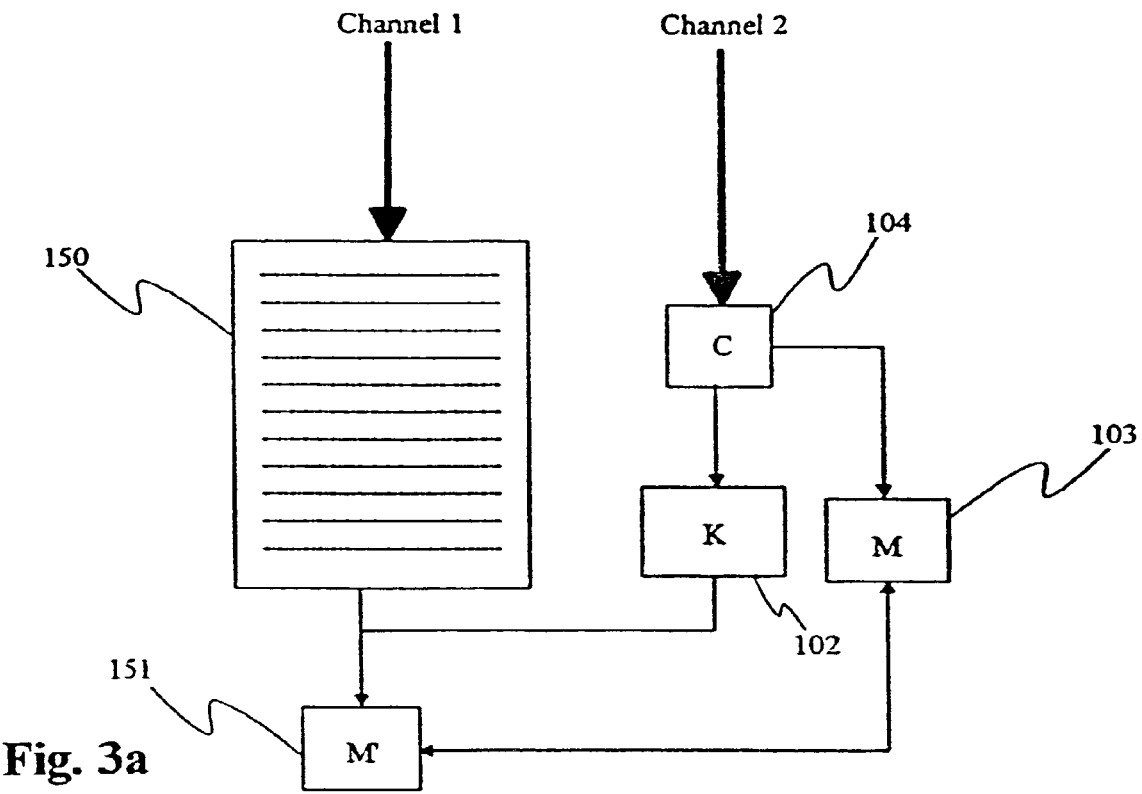
FIG. 3a illustrates a first preferred embodiment of the invention in the receiving end.

FIG. 3a illustrates the operations in the receiving end according to the first embodiment of the invention. A second message 150 is received through a first channel. The check value 104 is received through a second channel. The authentication value 103 and the random string are separated. The random string and the received message 150 are used as parameters to generate an authentication check 151. The authentication check and the authentication value 103 are compared in the receiving end to determine the integrity of the message and to authenticate the correct sender.

Figure 3B:
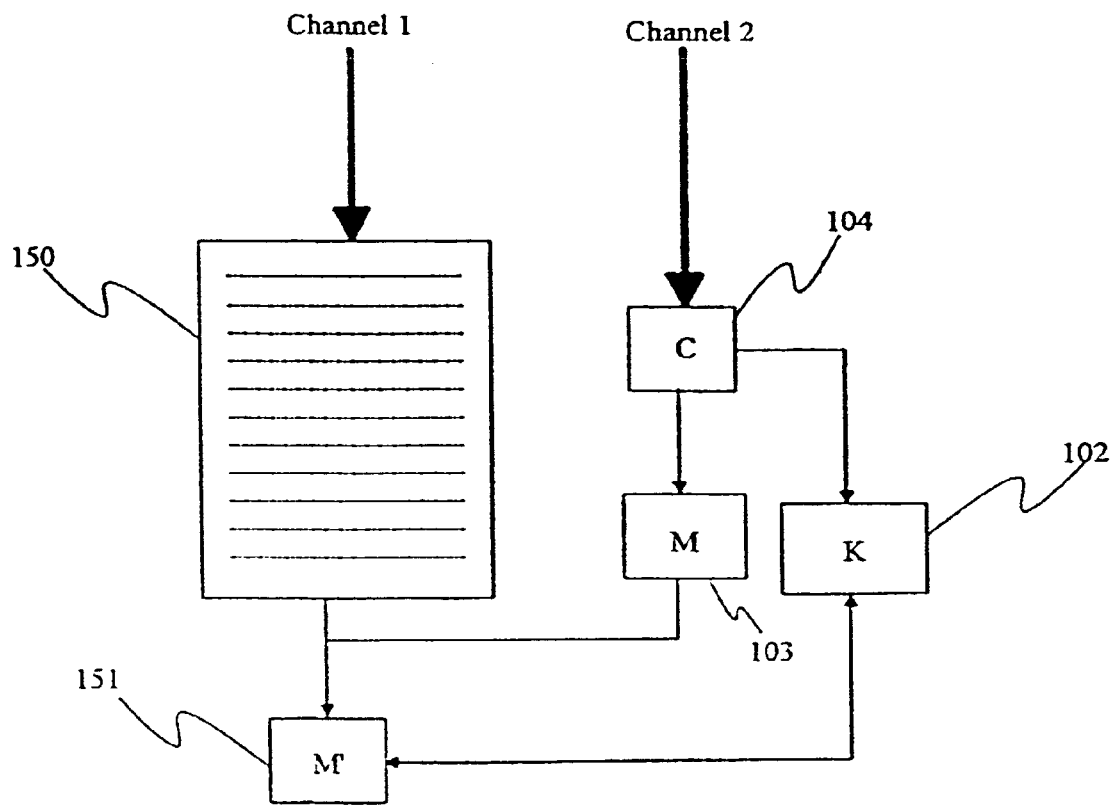
FIG. 3b illustrates a second preferred embodiment of the invention in the receiving end.

FIG. 3b illustrates the operations in the receiving end according to the second embodiment of the invention. A second message 150 is received through a first channel. The check value 104 is received through a second channel. The authentication value 103 and the random string are separated. The authentication value 103 and the received message 150 are used as parameters to generate an authentication check 151. The authentication check and the random string are compared in the receiving end to determine the integrity of the message and to authenticate the correct sender.

Figure 4:
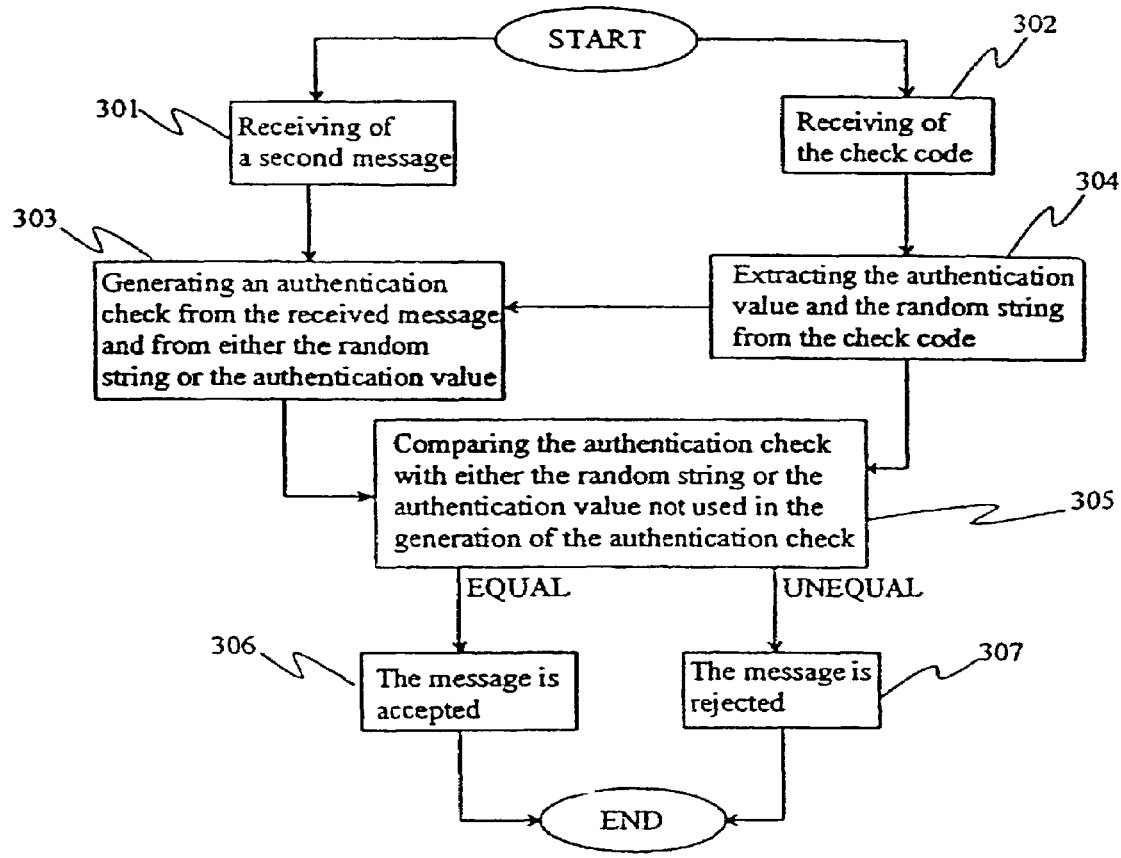
FIG. 4 illustrates a method according to a preferred embodiment of the invention in the receiving end.

In FIG. 4 it is shown a method according to the invention in the receiving end of the transmission path. First, a second message 101 and the check code 104 are received 301, 302. From the check code 104 received it is extracted 304 the original random string and the original authentication value 103. This is achieved by an inverse operation to the operation done in the transmitting end. In the simplest case the random string and the authentication value 103 can be just separated because advantageously it is known by the sender and the recipient how many numbers the random string and correspondingly the authentication value 103 comprise. The recipient can be sure that the random string and the authentication code 103 are original because they were transmitted through a secure channel. This kind of secure channel can for example be a telephone line. An authentication check 151 is calculated 303 from the second message 150 and either the random string 102 or the authentication value 103 gotten from the check code 104 received over the secure channel. Advantageously, the calculation method or algorithm for the authentication check 151 is agreed between the sender and the recipient in advance. After the authentication check 151 is calculated from the message 150, the authentication check 151 is compared with either the authentication value 103 or the random string not used in the generation of the authentication check 151 for checking the integrity of the second message compared to the first message. If the compared values are equal, it means that the message 101 received is original and it is accepted 306. If the comparison is unequal, the message 101 has changed in the transmission path and it is rejected 307. To anyone skilled in the art it will be evident that the authentication check 151 is a new random string value or a new authentication value, which authentication check 151 is compared to the original random string or to the original authentication value.

One advantage of the invention is that the key or the random string and the authentication value 103 can be relatively short since they are transferred through the secure out-of-band channel, which means that a third party cannot change them during the transmission. The security of the out-of-band channel is based on transparency, which means that a third party is not able to see the data to be transmitted.

Figure 5:
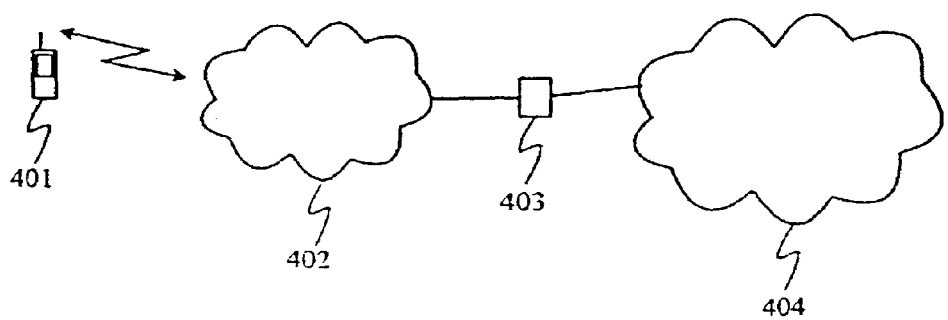
FIG. 5 illustrates a simplified arrangement according to the invention.

Next we consider the invention applied in a telecommunication system. As an example we describe the invention applied in the WAP (Wireless Application Protocol) system. In the WAP system it is possible to use Internet with a mobile terminal. The Internet browser uses wireless mark-up language (WML) and lightweight mark-up language. By these means the Internet application is based on text and no pictures are transmitted. In FIG. 5 it is shown a simplified arrangement of the system, which uses WAP. Here the mobile terminal 401 comprises means for receiving and transmitting information from the Internet network. In addition, the mobile terminal 401 comprises display means for showing information. The mobile terminal 401 is connected to a mobile network 402 through a radio interface. If the user of the mobile terminal 401 wants to get connected to the Internet, it is possible through the mobile network 402. The mobile terminal 401 uses WAP protocol through the mobile network 402 to a WAP server 403, which is connected to the World Wide Web (WWW) 404. The WAP server 403 is arranged to adapt the WAP protocol and the WWW protocols so that the WWW services can be used in the mobile terminal 401. As can be seen, the WAP, which specifies an application framework and network protocols for wireless terminals, brings the Internet content and advanced data services to wireless terminals. To anyone skilled in the art it is known that WAP can work across differing wireless network technologies and bearer types (GSM, CDMA, SMS).

When using WAP services, the user has to order the services from WAP service providers. Especially, in case where the user wants to get a new WAP service, he or she must get information about the server addresses and such so that the mobile terminal 401 contacts the right server when using the service in question. According to one embodiment of the invention the user calls to a helpdesk of the service provider to initiate a WAP service. The helpdesk registers the user by entering user information as well as the telephone number to a database. After the information needed is entered the system is arranged to calculate the check code. The check code is formed from the random string, which is generated by the service provider, and from the authentication value. The authentication value can be calculated by using a certain algorithm where the parameters are for example the message and the random string, as described earlier. The check code is told to the user by the helpdesk. Advantageously, the check code is short, like 8 digits. After this the helpdesk sends the data provisioned, like the server addresses, to the user's mobile terminal 401 as an SMS message, for example. According to this embodiment of the invention the user inputs the check code received from the help desk to the mobile terminal 401. The mobile terminal 401 separates the authentication value and the random string from the check code. After this the mobile terminal 401 is arranged to calculate an authentication check with the same algorithm, which was used in the transmitting end to generate the authentication value. The received message and either the random string or the authentication value are used as parameters for the algorithm in the mobile terminal 401. The authentication check and the one of the authentication value and the random string not used in the generation of the authentication check are compared in the mobile terminal 401 to each other. If these values are equal, the mobile terminal 401 activates the provisioning data.

According to another embodiment of the invention, the mobile terminal 401 views the authentication check on display so that the user can compare the check code received from the helpdesk with it. If they are equal, the user accepts the received data in a predetermined manner. In other case the user deletes the message. When the message is activated the user can use the WAP services of the service provider.

According to another preferred embodiment of the invention the user gets the check code from the Internet. The user for example chooses a web page of the service provider of the WAP services. The user fills out a form and registers in the service provider's database. After the registration the service provider generates the check code and transmits it through the Internet to the user. In transmission some sort of encryption method is used so that the transmission is secure. One kind of encryption method can be for example a SSL (Secure Sockets Layer). SSL is a program layer, which is created for Internet purposes for achieving security of message transmission in the Internet. One application of the SSL uses the public-and-private key encryption system. This means that the user and the service provider of the WAP services have made an agreement of the encryption beforehand. By means of this the check code can be delivered from the service provider to the user in a secure manner through the Internet. After the user has received a message containing bootstrap information to the mobile terminal 401 he or she can generate an authentication check in the same manner as described above and proceed with the comparison as described earlier. To anyone skilled in the art it will be evident that the Internet capabilities of the mobile terminal 401 can also be used in the same way. The user connects, to the Internet with the mobile terminal through the WAP services and gets the check code there. The connection is arranged to be secure for example in the same way as described above. After the check code and the message are received the authentication and the integrity can be checked in the mobile terminal 401 in the same way as described before.

Figure 6:
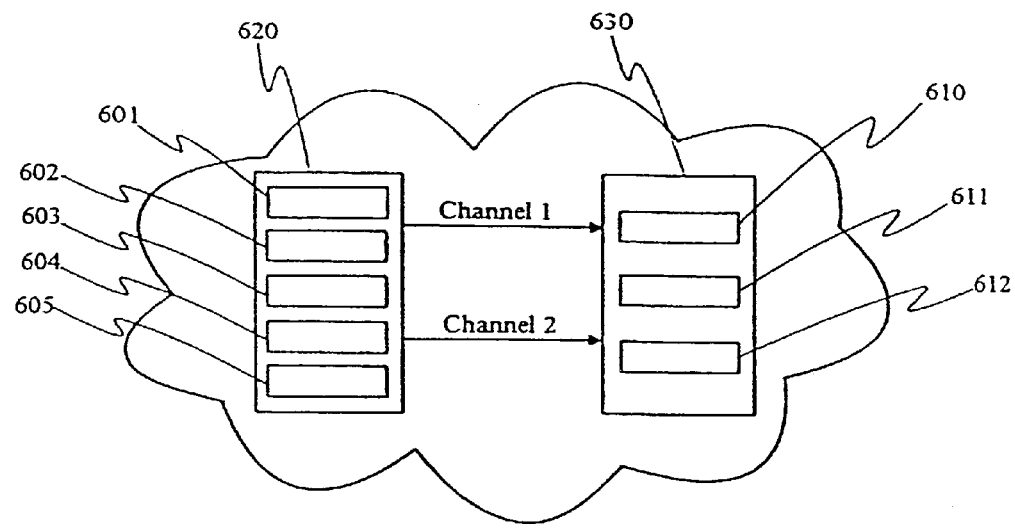
FIG. 6 illustrates a system according to the invention.

Generally, the system according to the invention shown in FIG. 6 comprises means for sending and receiving data. In the transmitting end 620 the system comprises means 601 for calculating an authentication value for a message to be sent and means 602 for generating a random string. According to the invention the system in the transmitting end 620 also comprises means 603 for forming a check code by combining the authentication value and the random string. It comprises means 604 for transferring the first message from the sender to the recipient through the first channel. This kind of means 604 can for example be an e-mail software or such. Advantageously, these means 604 are a mobile terminal, such as a WAP terminal by means of which it is possible to transmit and receive short messages (SMS). In addition, the system comprises means 605 for transferring the check code from the sender to the recipient through the second secure channel. This kind of means 605 can for example be a phone or an arrangement by means of which it is possible to form a secure channel between the sender and the recipient. In the receiving end 630 the system according to the invention comprises means 610 for separating said authentication value and said random string from said check code. This can be achieved by means of software or electronics. The system also comprises means 611 for generating an authentication check from the received message and from either the random string or the authentication value and means 612 for comparing the authentication check with either the authentication value or the random string not used in the generation of the authentication check for checking the integrity of the received message compared to the first message. Advantageously, these means 611, 612 are carried out by data processing means, such as a microprocessor, and software.

Figure 7:
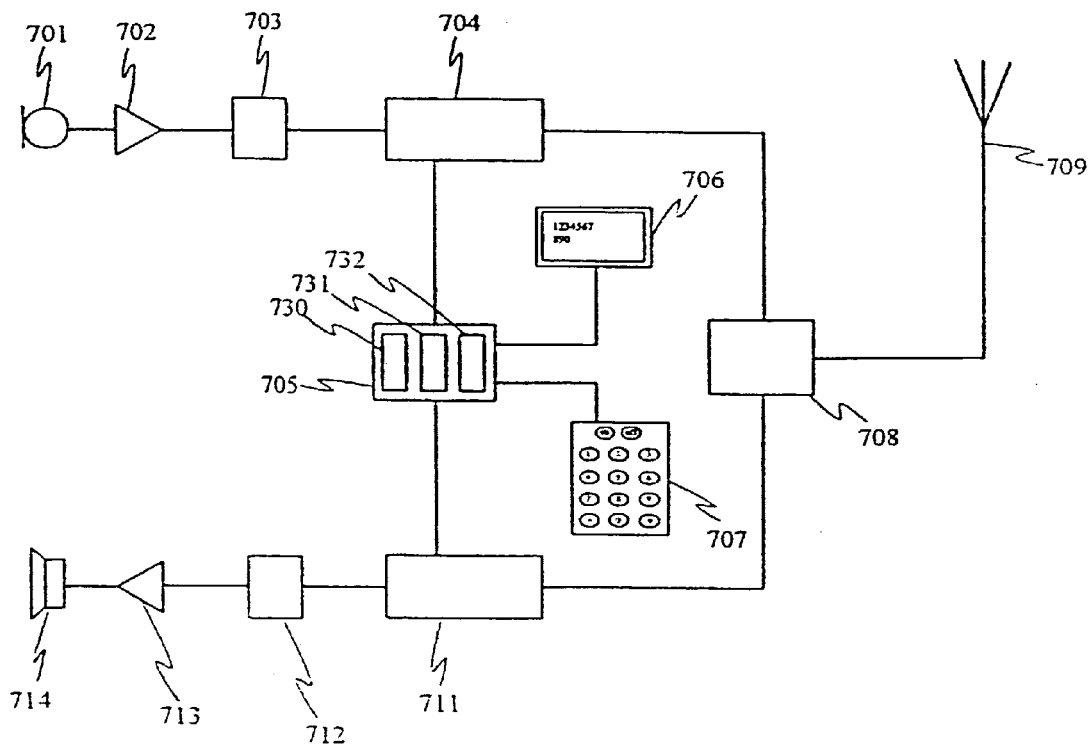
FIG. 7 illustrates a block diagram of a mobile terminal according to the invention.

FIG. 7 shows a block diagram of a mobile terminal according to a preferred embodiment of the invention. The mobile terminal comprises a microphone 701, keyboard 707, display 706, speaker or earpiece 714, antenna duplexer or switch 708, antenna 709 and a control unit 705, which all are typical components of conventional mobile communication means. Further, the mobile terminal contains typical transmission and receiver blocks 704, 711, which are used for sending and receiving data, like messages. Transmission block 704 comprises functionality necessary for speech and channel coding, encryption, and modulation, and the necessary RF circuitry for amplification of the signal for transmission. Receiver block 711 comprises the necessary amplifier circuits and functionality necessary for demodulating and decryption of the signal, and removing channel and speech coding. The signal produced by the microphone 701 is amplified in the amplifier stage 702 and converted to digital form in the A/D converter 703, whereafter the signal is taken to the transmitter block 704. The transmitter block encodes the digital signal and produces the modulated and amplified RE-signal, whereafter the RE signal is taken to the antenna 709 via the duplexer or switch 708. The receiver block 711 demodulates the received signal and removes the encryption and channel coding. The resulting speech signal is converted to analog form in the D/A converter 712, the output signal of which is amplified in the amplifier stage 713, whereafter the amplified signal is taken to the speaker or earpiece 714. The control unit 705 controls the functions of the mobile communication means, reads the commands given by the user via the keypad 707 and displays messages to the user via the display 706. In addition, the mobile terminal comprises input means for inputting a check code of the first message received through a secure channel into said mobile terminal. The input means can for example be the keyboard 707. With the first message it is meant a message, which is sent by the sender to the mobile terminal. The mobile terminal also comprises means 730 for separating an authentication value and a random string from the check code of the first message. It also comprises means 731 for generating an authentication check from the received message and from either the authentication value or the random string and means 732 for comparing the authentication check with either the authentication value or the random string not used in the generation of the authentication check for checking the integrity of the received message compared to the first message. To anyone skilled in the art it will be evident that by means of a mobile terminal according to the invention, it is possible to check if the received message is the same as the message sent. Means 730, 731, 732 can advantageously be realized with a microprocessor in the control unit 705 and software. In one preferred embodiment of the invention the mobile terminal is used in WAP applications. By means of the invention it is possible to check if the data received, like the WAP server addresses, are correct and from the correct sender.

To anyone skilled in the art it will be evident that the content of the message can comprise any other information than bootstrap information. The mobile terminal can be any kind of terminal in which it is possible to apply the present invention. The mobile terminal can for example be such as mobile telephones, pagers and personal digital assistants. The invention can be applied also in other data transmission applications than in WAP.

Generally, in view of the foregoing description it will be evident to any person skilled in the art that various modifications may be made within the scope of the invention. While the preferred embodiments of the invention have been described in detail, it should be apparent that many modifications and variations thereto are possible, all of which fall within the true spirit and scope of the invention.

The invention claimed is:

1. A method, comprising:
generating, by a device, a random string,
using, by the device, a first message and the random string for calculating an authentication value for the first message,
transmitting, by the device, the first message from a sender in a transmitting end towards a recipient in a receiving end through a first channel, and
transmitting, by the device, the authentication value and the random string towards the recipient through a second, secure channel for enabling the receiving end to determine whether a message received at said receiving end has integrity with the first message.

2. A method according to claim 1, comprising:
combining the authentication value and the random string are combined as a check code in the transmitting end, and
transmitting said check code through said second, secure channel.

3. A method according to claim 1, wherein the second, secure channel is out-of-band.

4. A method according to claim 1, wherein the message contains bootstrap information.

5. A system, comprising:
a transmitting end and a receiving end,
a component for generating a random string, and
a component for calculating an authentication value for a first message transmitted between a sender in the transmitting end and a recipient in the receiving end from the first message and the random string,
wherein in the transmitting end the system comprises:
a processor;
a component for forming a check code by combining the authentication value and the random string,
a component for transferring the first message from the sender to the recipient through a first channel, and
a component for transferring said check code from said sender to said recipient through a second secure channel,
and wherein in the receiving end the system comprises:
a processor;
a component for separating said authentication value and said random string from said check code,
a component for generating an authentication check from the received message and from either said random string or said authentication value, and
a component for comparing said authentication check with either said authentication value or said random string not used in the generation of said authentication check for checking the integrity of said received message compared to the first message.

6. A system according to claim 5, wherein the system comprises the operations of a wireless application protocol system.

7. An apparatus comprising:
a processor;
a component for receiving a message,
an input component for inputting an authentication value and a random string a received through a secure channel into said mobile terminal,
a component for generating an authentication check from said received message and from either said authentication value or said random string, and
a component for comparing said authentication check with that one of said authentication value or said random string that was not used in the generation of said authentication check for checking the integrity of said received message compared to a first message sent to said mobile terminal.

8. An apparatus according to claim 7, wherein said apparatus is a wireless application protocol terminal.

9. An apparatus according to claim 7, wherein said input component is configured for inputting a check code received through said secure channel, and wherein the apparatus comprises a component for separating said authentication value and said random string from said check code.

10. A mobile terminal, comprising:
a processor;
a receiver for receiving a message;
an input device for inputting an authentication value and a random string received through a secure channel into said mobile terminal;
a first module of a control unit for generating an authentication check from said received message and from either said authentication value or said random string; and
a second module of said control unit for comparing said authentication check with that one of said authentication value or said random string that was not used in the generation of said authentication check for checking the integrity of said received message compared to a first message sent to said mobile terminal.

11. A mobile terminal according to claim 10, wherein said mobile terminal is a wireless application protocol terminal.

12. A mobile terminal according to claim 10, wherein said receiver device is configured for inputting a check code received through said secure channel, and wherein the mobile terminal comprises a third module of said control unit for separating said authentication value and said random string from said check code.

13. A method, comprising:
receiving, by a device, a message through a first channel,
receiving, by the device, an authentication value and a random string through a second, secure channel,
generating, by the device, an authentication check from the received message and from either said random string or said authentication value,
comparing, by the device, said authentication check with that one of said authentication value or said random string that was not used in the generation of said authentication check, and
producing, by the device, an indication of integrity of said received message if said authentication check is the same as the value with which it is compared.

14. A method according to claim 13, comprising:
receiving a check code through said second, secure channel, and separating the authentication value and the random string from the check code in the receiving end.

15. An apparatus, comprising:
a processor,
a random string generator configured to generate a random string, a calculator part configured to use a first message and the random string for calculating an authentication value for the first message, a first transmitter configured to transmit the first message towards a recipient in a receiving end through a first channel, and a second transmitter configured to transmit the authentication value and the random string towards the recipient through a second, secure channel for enabling the receiving end to determine whether a message received at said receiving end has integrity with the first message.

16. An apparatus according to claim 15, wherein:

the apparatus comprises a combiner part configured to combine said authentication value and said random string to a check code, and said second transmitter is configured to transmit the check code towards the recipient through said second, secure channel.

17. A storage medium comprising machine-readable instructions that, when executed by a processor, cause the processor to implement the steps of:

generating a random string, using a first message and the random string for calculating an authentication value for the first message, transmitting the first message from a sender in a transmitting end towards a recipient in a receiving end through a first channel, and transmitting the authentication value and the random string towards the recipient through a second, secure channel for enabling the receiving end to determine whether a message received at said receiving end has integrity with the first message.

18. A storage medium comprising machine-readable instructions that, when executed by a processor, cause the processor to implement the steps of:

receiving a message through a first channel, receiving an authentication value and a random string through a second, secure channel, generating an authentication check from the received message and from either said random string or said authentication value, comparing said authentication check with that one of said authentication value or said random string that was not used in the generation of said authentication check, and producing an indication of integrity of said received message if said authentication check is the same as the value with which it is compared.

* * * * *